United States Patent
Sanchez-Brunete Alvarez

(10) Patent No.: US 8,100,686 B2
(45) Date of Patent: Jan. 24, 2012

(54) TOOL FOR AIDING RESIN DISTRIBUTION DURING THE CURING OF COMPOSITE MATERIAL PARTS

(75) Inventor: Desiderio Sanchez-Brunete Alvarez, Madrid (ES)

(73) Assignee: Airbus Operations, S.L., Madrid (ES)

( * ) Notice: Subject to any disclaimer, the term of this patent is extended or adjusted under 35 U.S.C. 154(b) by 634 days.

(21) Appl. No.: 11/699,742

(22) Filed: Jan. 30, 2007

(65) Prior Publication Data
US 2008/0181980 A1    Jul. 31, 2008

(30) Foreign Application Priority Data
Nov. 29, 2006    (ES) .................. PCT/ES2006/070183

(51) Int. Cl.
*B28B 1/08* (2006.01)

(52) U.S. Cl. ..................... 425/456; 425/404; 425/174

(58) Field of Classification Search .................. 425/404, 425/456, 174, 110; 264/510; 156/382
See application file for complete search history.

(56) References Cited

U.S. PATENT DOCUMENTS

| | | | | |
|---|---|---|---|---|
| 4,062,913 A * | 12/1977 | Miller et al. | .................. | 264/437 |
| 4,181,028 A * | 1/1980 | Talbott, Jr. | ....................... | 73/665 |
| 5,119,890 A * | 6/1992 | Valli | ............................... | 175/57 |
| 6,033,203 A * | 3/2000 | Christensen et al. | ...... | 425/174.2 |
| 6,461,551 B1 * | 10/2002 | Mandish | ......................... | 264/71 |

* cited by examiner

*Primary Examiner* — Maria Veronica Ewald
(74) *Attorney, Agent, or Firm* — Ladas & Parry LLP

(57) ABSTRACT

The invention relates to a curing tool (11) for curing a composite material part formed by bundles of fibers embedded in a resin matrix in an installation, such as an autoclave, allowing the curing of the part by means of applying high pressures and/or temperatures, comprising at least one mechanical vibrating actuator (1) acting on the curing tool (11) itself to facilitate resin distribution in the part during the curing process.

14 Claims, 1 Drawing Sheet

TOOL FOR AIDING RESIN DISTRIBUTION DURING THE CURING OF COMPOSITE MATERIAL PARTS

FIELD OF THE INVENTION

The present invention relates to a tool for aiding resin distribution during the curing of composite material parts.

BACKGROUND OF THE INVENTION

Composite materials are more and more appealing for a great variety of uses in several industries such as the aeronautical industry, the naval industry, the automobile industry or the sports industry due to their great strength and strength-weight ratio.

The composite materials that are most used in said industries are those consisting of fibers or bundles of fibers embedded in a thermosetting or thermoplastic resin matrix, in the form of a preimpregnated material or "prepreg".

A composite material part is formed by a plurality of pre-impregnated material layers. Each preimpregnated material layer is formed by fibers or bundles of fibers which may be crosslinked with one another forming different styles of fabric or which can be oriented in a single direction forming one-way tapes. These fibers or bundles of fibers are impregnated with resins (either thermosetting or thermoplastic resins) which in many cases are partially polymerized.

Composite materials with an organic matrix and continuous fiber which are mainly based on epoxy resins and carbon fibers are currently massively used, mainly in the aerospace industry.

The level of use of this type of parts has increased in the aeronautical industry until the current situation, in which composite materials with an epoxy and carbon fiber matrix can be considered to be the most used option in a great variety of structural elements. This situation has forced and continues to force the development of manufacturing processes that can produce elements with the required quality repeatedly and with a suitable manufacturing cost.

The process for manufacturing composite material parts generally requires a compaction to obtain the desired fiber volume and to eliminate cavities and trapped air in the composite material and a curing process whereby the crosslinking of the polymer chains of the resin impregnating the fibers is achieved.

These parts have traditionally been manufactured by means of applying pressure and vacuum (as compaction means) and applying heat (as a means for achieving the crosslinking of the polymer chains), particularly in an autoclave inside which a controlled atmosphere is created.

An important aspect of the curing process of the composite material parts lies in making the resin flow, be diffused and degassed in a suitable manner to achieve complying with the quality requirements of the part and particularly to prevent cavities and other defects.

In this sense, U.S. Pat. No. 6,033,203 describes the application of a high frequency, low amplitude acoustic vibration during the curing process of a composite material part.

The industry constantly demands new tools and new methods allowing the decrease of both the time and energy necessary for manufacturing composite material parts.

The present invention is aimed at satisfying this demand

SUMMARY OF THE INVENTION

One object of the present invention is to provide a curing tool facilitating resin distribution during the curing process of a composite material part.

This and other objects of the present invention are achieved by providing a curing tool for curing a composite material part formed by bundles of fibers embedded in a resin matrix in an installation allowing the curing of the part by means of applying high pressures and/or temperatures, characterized in that said curing tool comprises at least one mechanical vibrating actuator acting thereupon to facilitate resin distribution during the curing process.

Other features and advantages of the present invention will be disclosed in the following detailed description of an illustrative and non-limiting embodiment of its object in relation to the attached figures.

DETAILED DESCRIPTION OF THE INVENTION

Figure 1:
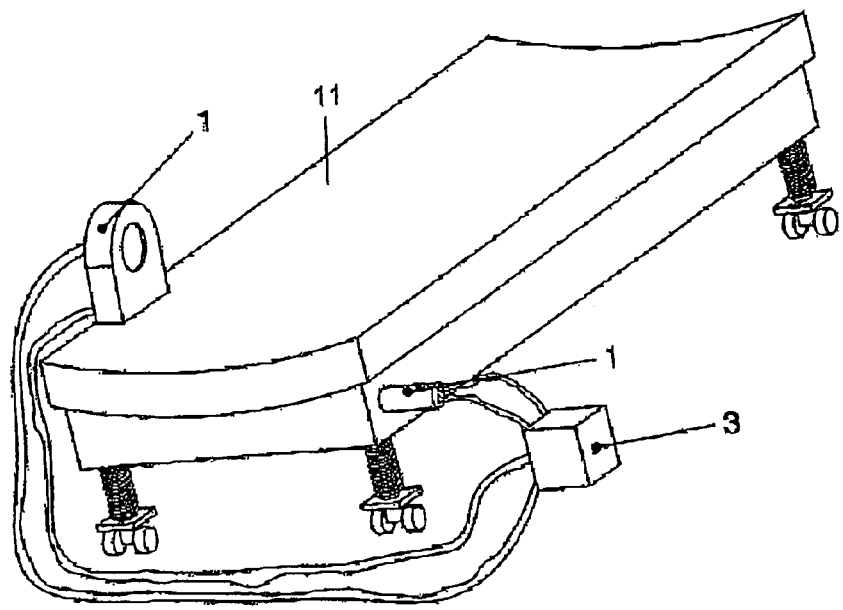
FIG. 1 is a schematic view of a curing tool for curing a composite material part including vibrating means according to the present invention.
Figure 2:
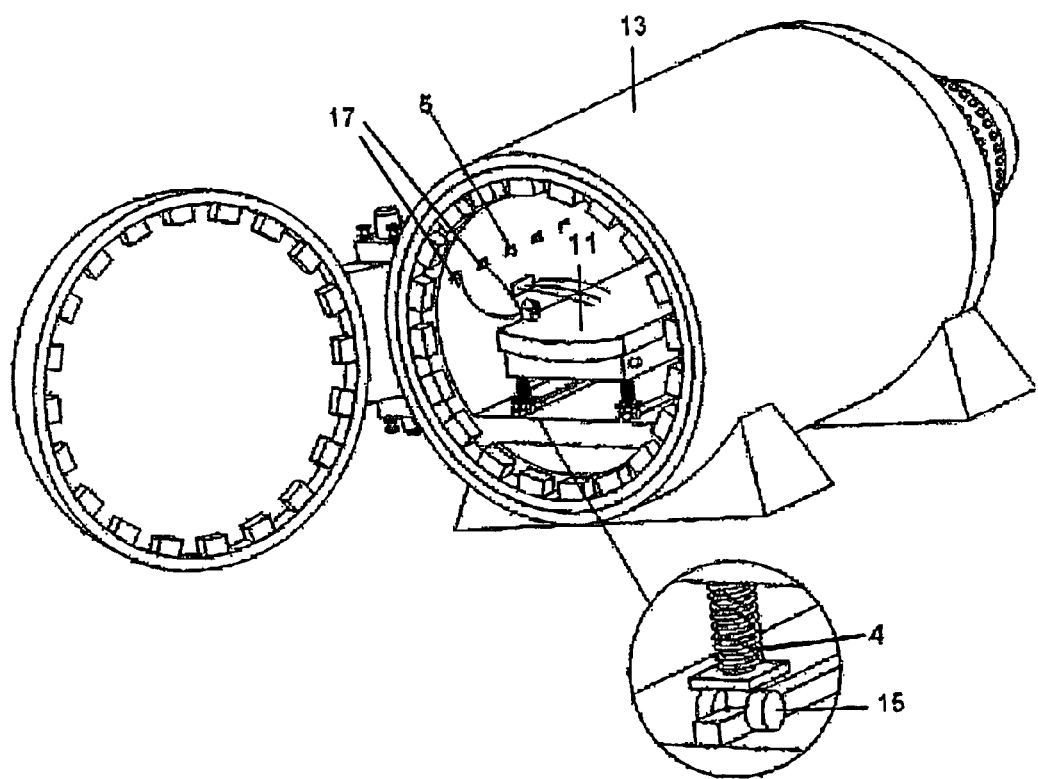
FIG. 2 is a schematic view of a curing tool for curing a composite material part according to the present invention inside an autoclave.

The aim of the curing tool with vibrating means according to the present invention consists of transmitting to the composite material part an oscillating movement with a pre-established frequency which facilitates the fluidization, diffusion and degassing of the resin during the curing process of the part.

This oscillating movement is caused by preferably pneumatically operated vibrating means incorporated to the curing tool.

For the purposes of the present invention, the curing tool must be understood in a broad sense as the tool on which the composite material part is placed during its curing process together with any element used during said process.

In the preferred embodiment of the invention shown in the figures in which the curing process takes place in an autoclave, it is observed that the curing tool 11 introduced in the autoclave 13 having a conventional basic structure also comprises the following elements provided by the present invention:

Two vibrating actuators 1 with pneumatic feed means 17 passing through the autoclave 13 through the bushing 5.

Oscillating devices 4 allowing the curing tool 11 which is solidly supported in the fixed wheels 15 for use in the autoclave to be elastically supported on the latter once it has been placed in the autoclave 13. In a preferred embodiment said oscillating devices 4 are springs located near the wheels 15 for supporting the curing tool 11.

A control device 3 for controlling the vibrating actuators 1.

The vibrating actuators 1 can be centrifugal actuators and/or impact actuators.

Centrifugal actuators contain a turbine with a deliberately decompensated distribution of masses which, upon rotating by the compressed air impulse, transmits to the curing tool 11 to which it is solidly fixed a vibrating frequency pulsation directly related to the rotation speed; the latter is in turn controlled by the flow circulating through the turbine, the feed and outlet ducts 17 of which, made of corrugated stainless steel, begin and end in a control panel outside the autoclave 13; the compressed air is also useful for cooling the device. The feed through these ducts also insulates the vibrating element of the actuator from the internal pressure of the autoclave 13.

Impact actuators complement the frequency range of centrifugal actuators.

The control device 3 of the actuators 1 allows manually activating or not activating its operation. In a preferred embodiment, the control device 3 includes means for analyzing each "curing load" of the autoclave, detecting the frequency range which can be obtained with the available assembly of actuators 1, assigning the optimal frequency to each actuator 1 and coordinating the vibration application time or times with the programmed curing cycle.

That which has been set forth in the foregoing is applicable to the case of ovens and means used in Resin Transfer Moulding (RTM) processes, in which the curing cycles are carried out in an atmospheric pressure environment.

A vibration with sufficient amplitude at a suitable frequency will cause an improvement in the evacuation of gassing bubbles in the resin, as well as an improved resin distribution so as to reach complex areas.

Modifications comprised within the scope defined by the following claims can be introduced in the preferred embodiment which has just been described.

The invention claimed is:

1. A curing system for curing a composite material part formed by bundles of fibers embedded in a resin matrix, the curing system comprising:
   an installation allowing the curing of the part by means of applying high pressures and/or temperatures,
   a curing tool comprising at least one pneumatic vibrating actuator arranged to act on the curing tool itself to facilitate resin distribution in the part during the curing process,
   pneumatic feed means for providing compressed air to actuate the at least one pneumatic vibrating actuator, the pneumatic feed means passing through the installation from outside the installation.

2. A curing system according to claim 1, wherein the curing tool comprises two pneumatically operated vibrating actuators.

3. A curing system according to claim 2, wherein said vibrating actuators (1) are selected from centrifugal actuators and/or impact actuators.

4. A curing system according to claim 1, further comprising oscillating means for facilitating the vibration thereof.

5. A curing system according to claim 4, wherein said oscillating means are springs.

6. A curing system according to claim 1, further comprising a control device for adjusting the frequency of each vibrating actuator to coordinate with a programmed curing cycle.

7. A curing system according to claim 1, wherein said installation is an autoclave.

8. A curing system according to claim 1, wherein said installation is a curing oven.

9. A curing system according to claim 1, wherein said installation is a curing installation of an RTM process.

10. A curing system according to claim 4, wherein said oscillating means (4) transmits a pre-established frequency to the composite material.

11. A curing system according to claim 1, wherein the pneumatic feed means passes through the installation through a bushing.

12. A curing system according to claim 1, wherein the pneumatic feed means comprises inlet and outlet ducts that begin and end in a control panel outside the installation.

13. A curing system according to claim 6 wherein in operation said control device detects a frequency range obtainable using said at least one pneumatic vibrating actuator and assigns an optimal frequency to each said actuator and coordinates vibration actuation time or times with a programmed curing cycle.

14. A curing system according to claim 7 wherein said system further comprises a control device for adjusting the frequency of each vibrating actuator wherein said control device detects a frequency range obtainable using said at least one pneumatic vibrating actuator and assigns an optimal frequency to each said actuator and coordinates vibration actuation time or times with a programmed curing cycle.

* * * * *